June 13, 1944.  J. C. BEIRISE  2,350,999
AIRPLANE TOWING MEANS
Filed Oct. 27, 1942  2 Sheets-Sheet 1
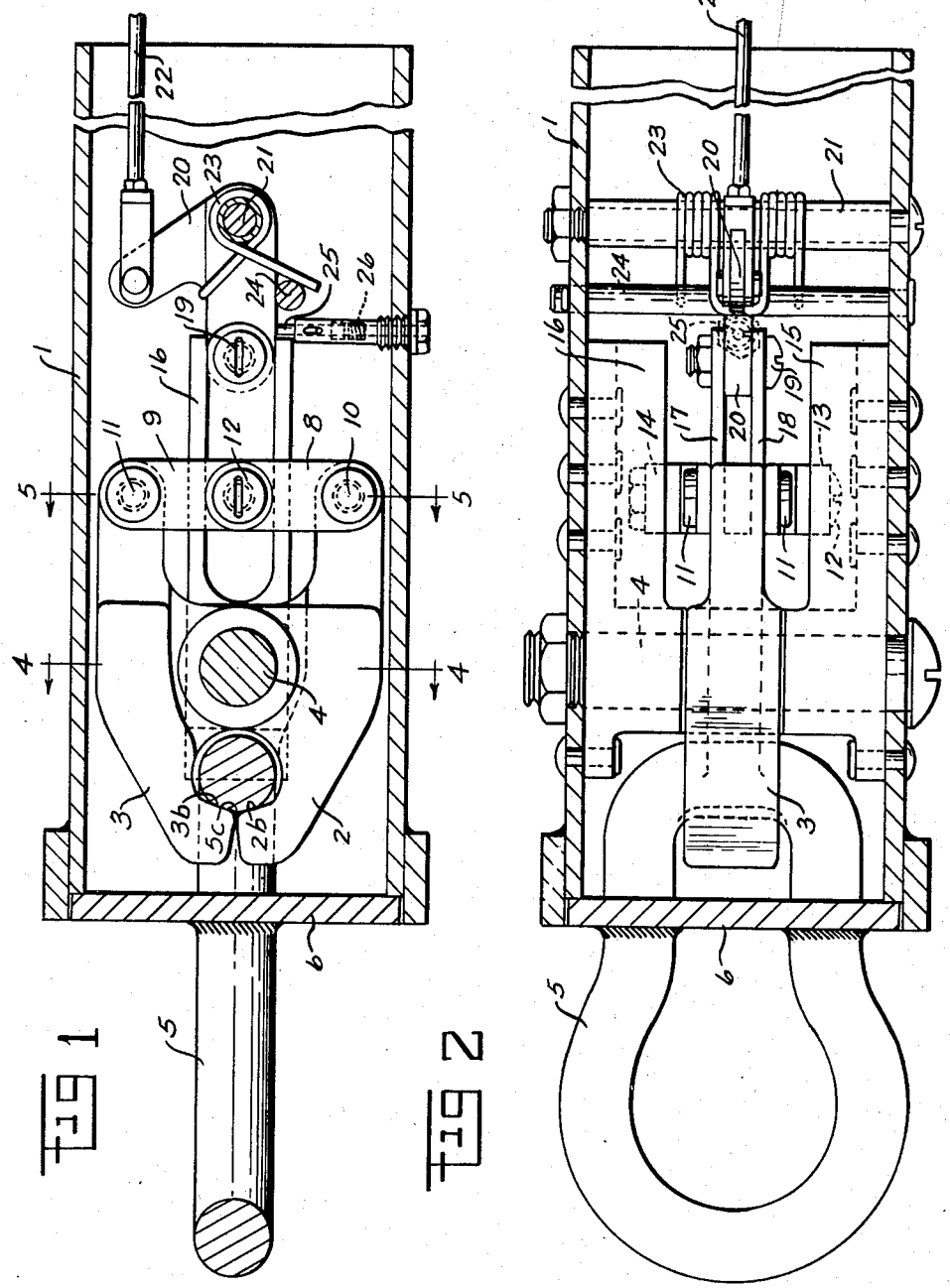
INVENTOR
JOHN C. BEIRISE
ATTORNEYS June 13, 1944.  J. C. BEIRISE  2,350,999
AIRPLANE TOWING MEANS
Filed Oct. 27, 1942  2 Sheets-Sheet 2
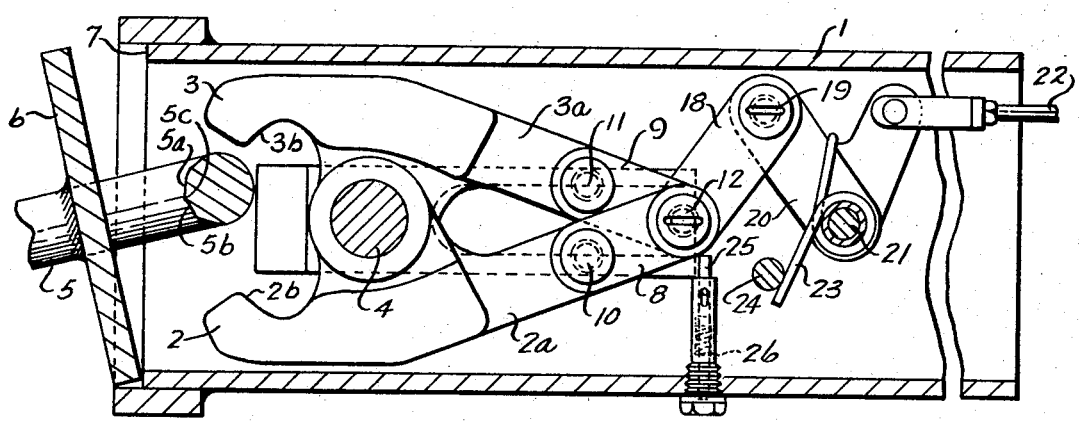
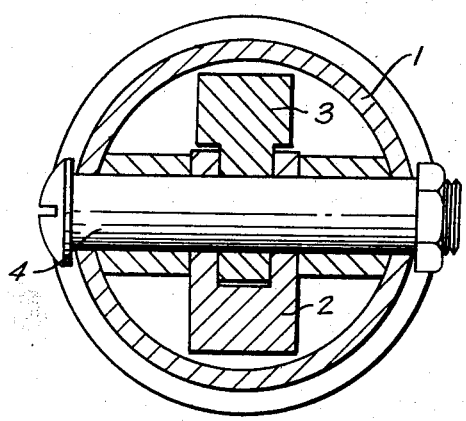 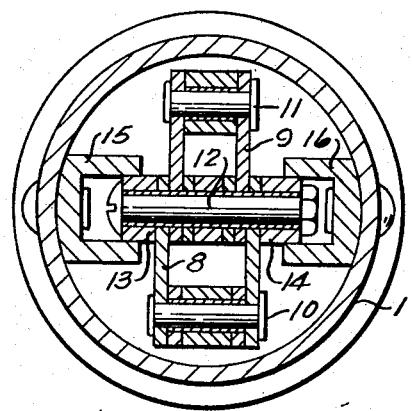
INVENTOR
JOHN C. BEIRISE

UNITED STATES PATENT OFFICE 2,350,999

AIRPLANE TOWING MEANS

John C. Beirise, Dayton, Ohio

Application October 27, 1942, Serial No. 463,556

4 Claims. (Cl. 280—33.15)

(Granted under the act of March 3, 1883, as amended April 30, 1928; 370 O. G. 757)

The invention described herein may be manufactured and used by or for Government for governmental purposes, without the payment to me of any royalty thereon.

This invention relates to towing means adapted particularly for use in airplane and glider towing operations.

For such purposes it is desirable that the towing connection between the airplane and the glider be releasable at will to enable the airplane and glider to be disconnected during flight. To this end the towing means may utilize a draft coupling comprising locking means detachably interconnectable with a draft member secured to the towing cable. However, one of the difficulties encountered in airplane and glider towing operations arises from the fact that the glider may not travel in the same plane as the towing airplane and, in fact, the towing airplane and glider may shift from time to time in their planes of travel with respect to one another. Thus, the towing connection, such as the cable or the like between the airplane and the glider, will not usually be aligned with the direction of travel of the airplane and glider, but such interconnecting cable will usually extend angularly with respect to the direction of travel thereof.

Since the angle of draft, or disposition of the interconnecting towing cable between the airplane and glider, must necessarily assume different directions with respect to the direction of travel, difficulty may be encountered in connection with coupling means heretofore used in effecting release of the draft connection during flight when it is desired to drop off the glider being towed by the airplane, such difficulty arising from the fact that the draft member may become, or remain, engaged with the locking means after the same is unlocked preparatory to release of the draft connection. This difficulty arises particularly where the locking means embodies latches or jaws hooking around the draft member when the same are in coupled relation.

It is, therefore, one of the principal objects of this invention to provide means for assuring immediate release of the draft member from the locking means when the latter is in unlocked condition.

Another object of this invention is to provide a very simple and effective draft coupling for the purposes described wherein the coupling elements are so constructed and arranged that the towing stresses are not critical, are evenly distributed with respect to the locking parts, and the cooperation of the coupling elements is such that they are enabled to withstand high pulling forces without separation of the locking elements during coupled relation.

Another object of the invention is to provide a draft coupling in which the locking jaws and draft member adapted for interlocking engagement are so designed as to have extended frictional bearing engagement under draft conditions and yet are so designed as to admit of a camming action of the draft member with respect to the locking jaws when the latter are released from locking condition, whereby the coupling is capable of withstanding high pulling forces without separation under draft conditions, and at the same time provides for quick and positive opening of the locking jaws when release of the towing connection is desired upon unlocking of the locking means.

Another object of the invention is to provide an indicator or signal means cooperative with the locking means or the actuating means therefor to visually indicate the locked condition and the unlocked condition of the locking means.

With the foregoing ends in view, the embodiment of my invention herein disclosed includes coupling means comprising a draft member and locking means adapted for detachable and interlocking connection therewith, which locking means is secured to supporting means which may comprise a housing, the draft member having guide means associated therewith and cooperable with said supporting means when the draft member and locking means are in coupled relation. The cooperation of the guide means with said supporting means is such as to maintain the draft member in fixed relation to the locking means when the same are in this coupled relation, and this cooperation is such as to cause the draft member to move under draft in a predetermined relation to the locking means upon unlocking of the latter, whereby the draft member will positively be drawn free of the locking means in the uncoupling operation regardless of the direction of pulling force on the draft member with respect to the locking means. The locking means may include jaws or latches and the engaging portions of the locking jaws and of the draft member preferably comprise flat engaging surfaces, providing extended frictional bearing of the draft member with respect to the locking jaws under draft conditions when the jaws are locked. The respective flattened surfaces on the draft member preferably meet at an angle, the apex of which lies intermediate the respective engaging surfaces of the jaws. This configuration of the locking jaws and draft member not only provides greater bearing area enabling the draft coupling to withstand greater pulling forces under coupled condition without pulling the jaws apart, but also enables the draft member to effect a camming action with respect to the jaws, tending to spread them apart when the jaws are unlocked.

Other objects, advantages and features of novelty will become apparent as the description of the invention proceeds in conjunction with the accompanying drawings in which:

Figure 1 is a plan view of apparatus embodying my invention, certain parts being shown in section and illustrating the draft means and locking means in coupled relation.

Figure 2 is a view taken at right angles to the showing of Figure 1.

Figure 3 is a view similar to Figure 1 showing the locking means in unlocked condition.

Figure 4 is a transverse sectional view on the line 4—4 of Figure 1, looking in the direction of the arrows.

Figure 5 is a transverse sectional view on the line 5—5 of Figure 1, looking in the direction of the arrows.

Now, referring to the drawings for a description of the invention, the apparatus there shown comprises supporting means including a housing 1, which may be cylindrical and secured upon the nose of a glider or upon the tail of an airplane. Within the housing 1 are positioned locking means comprising the oppositely acting locking jaws 2 and 3, pivotally mounted on a pin or shaft 4. These jaws when closed, as shown in Figure 1, are adapted to anchor the towing means comprising a draft member 5, taking the form of a towing ring as illustrated, the jaws 2 and 3 engaging around the inner portion of said ring 5, when the parts are in coupled relation. The draft member 5 has rigidly secured thereto a guide member 6, comprising a cover plate adapted to fit within the housing 1 in seating engagement with an annular shoulder or seat 7 provided therein, adjacent the open end thereof. This member 6 serves, when so positioned, as a cover for the housing 1, preventing water or ice from getting therein to interfere with the operation of the locking means, and also serves to position the draft member 5 in fixed relation to the locking means, comprising the jaw members 2 and 3, when the draft member is in coupled relation to said locking jaws.

The jaws or latches 2 and 3 are provided with lever extensions 2a and 3a respectively to which the toggle links 8 and 9 are respectively pivoted as at 10 and 11 respectively. The opposite ends of toggle links 8 and 9 are pivoted to a connecting pin 12, which has journalled at either end thereof the bearing members 13 and 14, which are positioned for sliding movement in guides 15 and 16 respectively secured to opposite sides of the cylindrical housing 1 and extending longitudinally thereof in the direction of application of the draft force. Links 17 and 18 are pivoted to the connecting member 12 and at their opposite ends these links are pivoted, as at 19, to one arm of a bell crank lever 20 which is pivotally mounted on a pin or shaft 21 secured to the housing 1. The other arm of the bell crank lever 20 is adapted to be connected to a release cable 22 extending within the aircraft to which the housing 1 is attached. The bell crank lever 20 is biased in a counterclockwise direction, having reference to Figures 1 and 3, by means of a spring 23 which causes the bell crank 20 normally to engage a stop or a button 24 in its normal position shown in Figure 1. In this position the bell crank lever 20 engages and depresses outwardly an indicator pin 25 biased inwardly by a spring 26, thereby indicating the closed or locked condition of the jaws 2 and 3. The pin 25 moves inwardly, as shown in Figure 3, when the bell crank lever 20 is rotated out of engagement therewith, thereby indicating the unlocked condition of the locking jaws 2 and 3 as shown in Figure 3.

In the use of the invention, duplicate sets of the apparatus shown in the drawings will usually be provided, with the housings 1 respectively mounted in the nose of a glider and in the tail of an airplane and a cable or other towing line attached to and extending between the respective towing rings 5 so that release of the towing connection between the airplane and glider may be effected from either. In operation, when the tow line and draft member are operative to tow a glider or the like, the draft member 5 and locking jaws 2 and 3 are in coupled relation as shown in Figure 1, the jaws 2 and 3 engaging around the ring 5, and the toggle links 8 and 9 are in aligned position locking the jaws 2 and 3 closed, as shown in Figure 1, preventing said jaws 2 and 3 from releasing the ring 5. The tow line stresses are transmitted from the jaws 2 and 3 through the mounting pivot 4 directly into the housing 1 to be distributed into the aircraft framework.

When the pilot desires to release the tow line he pulls on the cable 22 attached to bell crank lever 20, causing the same to be moved in a clockwise direction, having reference to Figures 2 and 3, to move the link 18, toggle links 8 and 9, and jaws 2 and 3, to their respective positions, shown in Figure 3, the jaws 2 and 3 being caused to open and release the towing ring 5 upon the rearward movement of the linkage as just described. The guide member 6 integral with the tow ring 5 ensures that the tow ring 5 will move in a path free from locking cooperation with the jaws 2 and 3 under a condition of draft exerted upon the tow ring 5 during the uncoupling operation after the locking jaws 2 and 3 have been opened, as indicated in Figure 3, because of the cooperation of the guide member 6 with housing 1 preventing the tow ring 5 from remaining or becoming engaged with either of the jaws 2 or 3 during uncoupling.

In the event that the direction of pull on the tow ring 5 is at an angle to the longitudinal axis of the housing 1, the guide member 6 serves, during the uncoupling operation when the locking jaws 2 and 3 are open, as a hinge point in cooperation with the housing 1 to cause the tow ring 5 to be pulled in a path free from locking engagement with the jaws 2 and 3 in the manner indicated in Figure 3 which illustrates the action of the guide member 6 in the uncoupling operation under a condition in which the direction of pull on the draft member 5 is at an angle to the longitudinal axis of the housing 1. If it were not for the provision of the integral guide member 6, the tow ring 5 would tend to remain engaged with the portion 2b of the locking jaw 2 during the uncoupling condition just described, due to the angular direction of draft pull on the tow ring 5 with respect to the longitudinal axis of the housing 1, even though the jaws 2 and 3 were in unlocked condition as indicated in Figure 3, and under such circumstance of the tow ring 5 remaining in engagement with the portion 2b of the jaw 2 (or the similar curved surface of the jaw 3), the desirable immediate separation of the tow ring 5 from the jaws 2 and 3 when the latter are in unlocked condition would be prevented. Thus, it will be apparent that the cooperation of the guide member 6 with the housing 1 will obviate any such condition of the draft member 5 remaining in locking engagement with either of the jaws 2 or 3 during the uncoupling operation and the guide member 6 ensures immediate release of the parts under draft conditions as soon as the jaws 2 and 3 are placed in open or unlocked condition indicated by Figure 3.

It will be apparent also that in the coupled relation of the draft member 5 and the locking jaws 2 and 3, indicated by Figure 1, the cooperation of the guide member 6 with the housing 1 maintains the tow ring 5 in predetermined fixed relation with respect to the jaws 2 and 3 during the existence of such coupled relation. Thus, the tow ring 5 is prevented from being pulled more against one than the other of the jaws 2 and 3 when the direction of draft exerted upon the towing member 5 during the towing operation is angular to the longitudinal axis of the housing 1. Since, in the construction illustrated, the draft member 5 is caused to remain in fixed relation to the jaws 2 and 3 when the parts are in coupled relation, the towing stresses are evenly distributed upon said jaws 2 and 3.

Moreover, the inner ring engaging surfaces 2b and 3b of the jaws 2 and 3 are flattened and the towing ring 5 is provided with correspondingly flattened surfaces 5a and 5b respectively engaging the flattened surfaces 2b and 3b when the parts are in coupled relation, thereby providing extended frictional bearing area between the towing ring 5 and the jaws 2 and 3 under draft conditions. This enables the towing connection, when the draft member 5 and jaws 2 and 3 are in coupled relation of Figure 1, to withstand greater pulling forces without causing separation of the jaws 2 and 3 when they are in their locked closed position of Figure 1. Nevertheless, the flattened surfaces 5a and 5b on the towing ring 5 meet at an angle, the apex 5c of which lies intermediate, or on the line of separation between the meeting edges of the jaws 2 and 3 when the parts are in the coupled relation of Figure 1. Consequently, although the provision of extended frictional bearing surfaces on the towing ring 5 and jaws 2 and 3 enables the draft coupling to withstand greater pulling forces than would otherwise be the case under draft conditions, the fact that the apex 5c of the flattened surfaces 5a and 5b on the towing ring 5 lies intermediate the jaws 2 and 3 when the parts are in coupled relation of Figure 1 enables the towing ring 5 to exert a camming action with respect to the jaws 2 and 3 under draft conditions when the jaws are unlocked, this camming action tending to cause quicker and more positive separation of the jaws 2 and 3 in the uncoupling operation when the jaws 2 and 3 are unlocked.

Having thus described my invention, what I claim as new and desire to secure by Letters Patent is:

1. Means of the class described, in combination, a draft member, a housing having an opening for receiving the draft member, locking means associated therewith and positioned therein and cooperable with said draft member for detachably securing the same with respect to said housing, and a guide member rigid with said draft member and cooperable with said housing for causing the draft member to move under draft in a predetermined relation to the locking means upon unlocking of the latter, whereby the draft member will be drawn free of the locking means in the uncoupling operation regardless of the direction of the draft pull, said housing having a shoulder providing a seat adjacent said opening and the guide member comprising a coverplate engaging said seat and closing said housing when seated.

2. In coupling means of the class described, in combination, a pair of oppositely acting locking jaws pivoted on a common axis, and means for actuating said jaws to lock and unlock the same, said actuating means comprising a pair of toggle links respectively pivoted to said jaws, a connecting pin, said toggle links being pivotally connected thereto, fixed guides cooperable with the opposite ends of said pin, and means for moving the connecting pin in said guides to bring the toggle links into and out of alignment, said last means including a link pivoted to said connecting pin, a bell crank lever pivoted to said last link, and spring means associated with said lever to bias the links to a position locking the jaws closed.

3. In means of the class described, in combination, a coupling means comprising a pair of oppositely acting locking jaws, means for actuating said jaws to lock and unlock the same, and signal means cooperable with said actuating means to indicate locked and unlocked conditions of said jaws, said signal means comprising a spring biased pin normally in the path of movement of a portion of the actuating means, said pin being movable thereby when engaged therewith.

4. In coupling means of the class described, in combination, a draft member and a pair of oppositely acting locking jaws cooperable therewith for detachable connection thereto, said jaws engaging around said member when in coupled relation therewith, the engaging portions of said jaws and said draft member having flat engaging surfaces providing extended frictional bearing under draft condition when the jaws are locked, the respective jaw engaging surfaces of said member meeting at an angle, the apex of which lies intermediate the respective engaging surfaces of the jaws whereby said meeting engaging surfaces of the draft member act to cam the jaws to open position under coupled, draft conditions when the jaws are released from locked condition.

JOHN C. BEIRISE.